Feb. 25, 1958  G. E. H. HANSON  2,825,003
FLASHING LIGHT

Filed May 3, 1954  2 Sheets-Sheet 1

INVENTOR.
GEORGE E. H. HANSON

BY James B. Christie

ATTORNEY

Feb. 25, 1958  G. E. H. HANSON  2,825,003
FLASHING LIGHT
Filed May 3, 1954  2 Sheets-Sheet 2

INVENTOR.
GEORGE E. H. HANSON
BY James B. Christie
ATTORNEY

United States Patent Office 2,825,003
Patented Feb. 25, 1958

2,825,003

FLASHING LIGHT

George E. H. Hanson, Glendale, Calif.

Application May 3, 1954, Serial No. 427,109

1 Claim. (Cl. 315—204)

This invention relates to light sources, and more particularly, to an improved circuit and apparatus for providing a flashing light for emergency use, or the like.

With the development of gas filled tubes to provide sources of brilliant light, electronic stroboscopic light sources have been devised for photographic purposes. In general, these devices include a gas filled tube and a storage capacitor which may be discharged through the gas filled tube to provide a flash of light.

A limitation on the use of these devices has been the energy required to ionize the gas in the gas tube. Known devices require a considerable amount of power to initiate the flash.

In accordance with my invention, I provide an improved flashing light including a gas filled flash tube which may be ionized with a small amount of power. In addition, and in one embodiment, I provide an emergency light which includes means for disabling the operation of the light in certain positions and under certain conditions of ambient illumination.

In another embodiment, I include a phosphorescent layer which provides a continuous light source of lower intensity than the flashes.

Briefly, the invention includes a gas filled flash tube across which is connected a storage capacitor, an autotransformer connected serially with an auxiliary electrode placed adjacent to the flash tube, and a capacitor connected to the autotransformer which may be alternately charged and discharged for ionizing the gas in the flash tube.

In one embodiment, a mercury switch is included for disabling the operation of the light when it is placed in certain positions, and in another embodiment, a photocell is employed to disable the operation of the flashing light when the ambient illumination is greater than a predetermined level.

A better understanding of the operation and advantages of my invention may be had upon a reading of the following specification and inspection of the drawings, in which.

Figure 1:
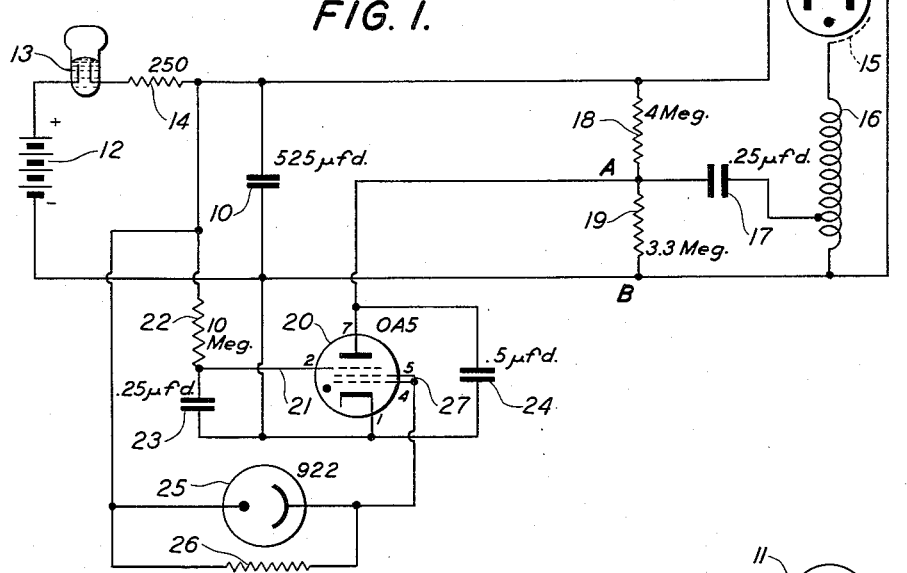
Fig. 1 is a schematic circuit diagram of one embodiment of my invention.

Turning in detail to Fig. 1, a storage capacitor 10 is connected across the internal electrodes of a gas filled flash tube 11. The capacitor 10 may be charged from a suitable source of potential, such as the battery 12, which is connected serially with a mercury switch 13 and a surge limiting resistance 14. The surge limiting resistance 14 should preferably have a negative temperature coefficient so as to present a larger resistance to the flow of current from the battery 12 at the beginning of the charging operation than is presented during the later part of the charging operation.

When the storage capacitor 10 is fully charged, the full potential of the potential source 12 appears across the internal electrodes of the gas filled flash tube 11. The gas within the flash tube 11 may be ionized by means of an auxiliary electrode 15 which is placed adjacent to the envelope of the flash tube 11. When an electrical impulse of substantial voltage is applied to the auxiliary electrode 15, the flash tube 11 is ionized or fired, and the capacitor 10 discharges through the flash tube, thereby providing a brilliant flash of light. In order to provide the electrical impulse for firing the flash tube 11, a coil 16 is connected serially between auxiliary electrode 15 and one of the internal electrodes of the flash tube. The coil 16 functions as an autotransformer, and when a pulse is applied across a portion of the coil, a relatively large voltage pulse appears at the auxiliary electrode 15.

An electrical impulse across a portion of the coil 16 may be provided by means of a firing capacitor 17, connected between an intermediate point on the coil 16 and an intermediate point on a voltage divider which includes the resistances 18 and 19. During the same time that the storage capacitor 10 is being charged, the firing capacitor 17 is also being charged.

By means of the firing electron tube 20, and its associated circuitry to be described presently, points "A" and "B" are connected to each other, which results in the resistor 19 being effectively shorted out. This causes the firing capacitor to discharge rapidly, thereby providing an electrical impulse across a portion of the coil 16, and due to the action of the coil 16 as an autotransformer, a relatively large voltage electrical impulse appears at the auxiliary electrode 15. Hence, the firing electron tube 20 acts as a switching means for completing an electric circuit serially including the tube 20, the capacitor 17, and a portion of the autotransformer 16.

The electron tube 20 may comprise a gas filled cold cathode type of discharge tube. By elevating the potential of a control electrode 21 in the firing tube 20, conduction in the tube may be initiated, and since the anode is connected to point A, and the cathode is connected to point B, a connection is made between point A and point B via the conduction path of the firing electron tube 20. By periodically causing the firing electron tube 20 to become conducting, the firing capacitor 17 may be periodically discharged, thereby causing flashes of light from the flash tube 11.

In order to automatically render the firing electron tube 20 conducting periodically, a passive circuit including a charging resistor 22 connected serially with a capacitor 23, is coupled to the positive side of the direct current supply or battery 12. The capacitor 23 is slowly charged to a given level, which causes the firing electron tube 20 to conduct, and due to current flow between the cathode and the control electrode 21, the capacitor 23 is discharged. Since the potential at point A drops, due to the discharge of the capacitor 17, the firing electron tube 20 is rendered non-conducting. To prolong the period in which the firing electron tube 20 is conducting, a capacitor 24 may be connected between the anode and cathode of the firing tube.

The circuitry thus far described will function to provide periodically an intense flash of light from the flash tube 11, and where a continuous flashing operation is desired, no further apparatus need be employed. However, for certain applications, such as outdoor beacons or emergency lights, the apparatus may be adapted by means of the photocell 25 and the resistance 26 to become inoperative when the ambient illumination, such as daylight, is greater than a predetermined level. This is desirable to preserve the battery 12 which may rejuvenate itself from a rest during daylight hours.

The function of the photocell 25, and the resistor 26, is to change the potential on the auxiliary electrodes 27 of the firing tube 20. When no light shines on the photocell 25, the potential at the auxiliary control electrodes 27 is determined by the value of the resistor 26. However, when light shines on the photocell 25, current flows therein, thereby elevating the potential at the auxiliary control electrodes 27. This has been found to disable the operation of the firing tube 20.

Figure 2:
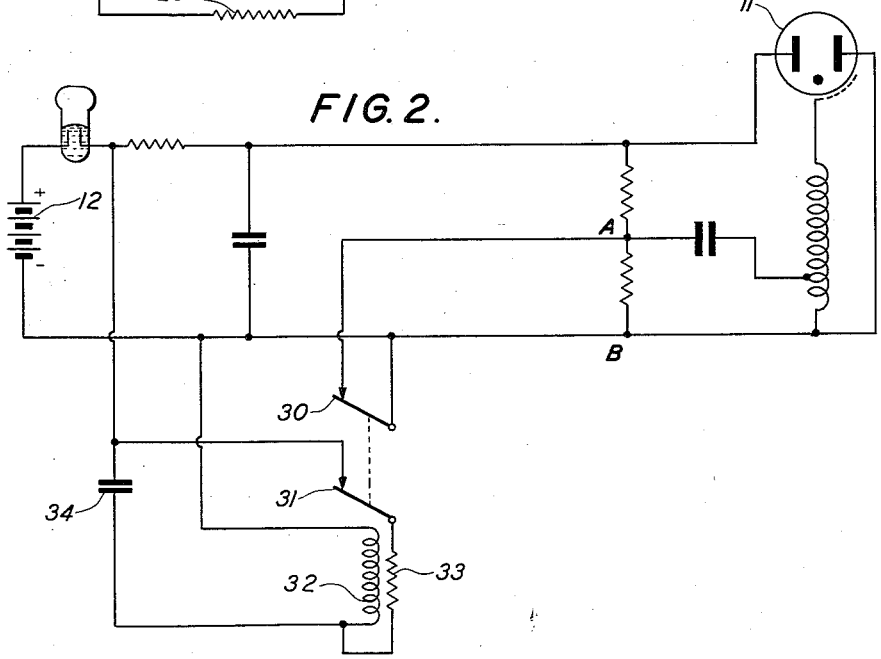
Fig. 2 is a schematic circuit diagram including a relay for charging and discharging a firing capacitor.

Fig. 2 shows an alternative embodiment of the invention in which an electrical relay is employed in lieu of the firing electron tube 20 and its associated circuitry of Fig. 1. Thus, the points A and B may be connected together periodically via the relay contacts 30. Assuming these contacts to be closed, a like pair of contacts 31 allow current to flow from the battery 12 through the relay coil 32 via a current limiting resistor 33. At this same time, a capacitor 34 is charged and when it reaches a certain level, the voltage across the relay coil 32 reaches a value sufficient to cause the armature to be drawn toward the relay coil 32, which causes the contacts 30 and the contacts 31 to open. This disconnects the relay 32 from the battery 12 and the capacitor 34 discharges. The cycle then repeats itself.

The operation of the rest of the circuitry of Fig. 2 is the same as that described with respect to Fig. 1. Thus, the connection of point A to point B causes a flash of light from the flash tube 11.

Figure 3:
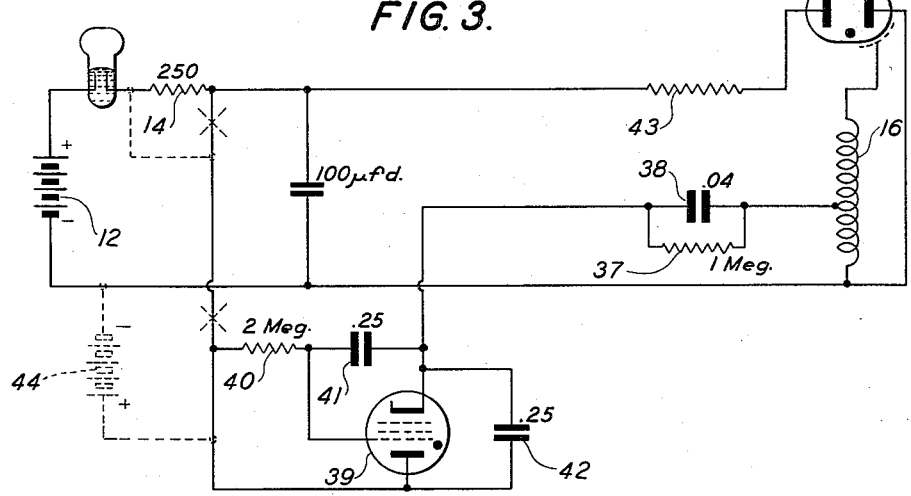
Fig. 3 is a schematic diagram including an alternative electron tube circuit for initiating the ionization of the gas in a flash tube.

Fig. 3 shows another method for alternately charging and discharging a firing capacitor 38 which is connected to a tap on an autotransformer 16. Here the firing electron tube 39 has its cathode coupled to the autotransformer 16 via the parallel combination of the firing capacitor 38 and a resistor 37. The firing tube 39 may be of the same type as the firing tube 27 of Fig. 1, and may be fired in a similar manner by means of a charging resistor 40 and a capacitor 41, similar to charging resistor 22 and the capacitor 23 of Fig. 1.

It might be noted that the rate of flashing depends in part upon the values of the capacitors 41 and 42, and where a relatively fast rate of flashing is desired the values of these capacitors may be reduced, or in fact, the capacitors may be eliminated. As will be noted in Fig. 3, an additional resistor 43 has been inserted serially between one of the control electrodes of the flashing tube 11 and the storage capacitor 10. This limits the current flow between the storage capacitor 10 and the flashing tube 11 so as to prolong the duration of the flash of light.

As indicated, the anode potential for the firing tube 39 may be derived in a number of ways. Where it is derived from the battery 12, the anode may be connected to either side of the surge limiting resistor 14. On the other hand, a separate source of potential may be provided for the anode of the firing tube 39 if desired. Thus, the anode may be connected to a battery 44 instead. In other respects the operation of the apparatus of Fig. 3 is the same as that previously described.

Figure 4:
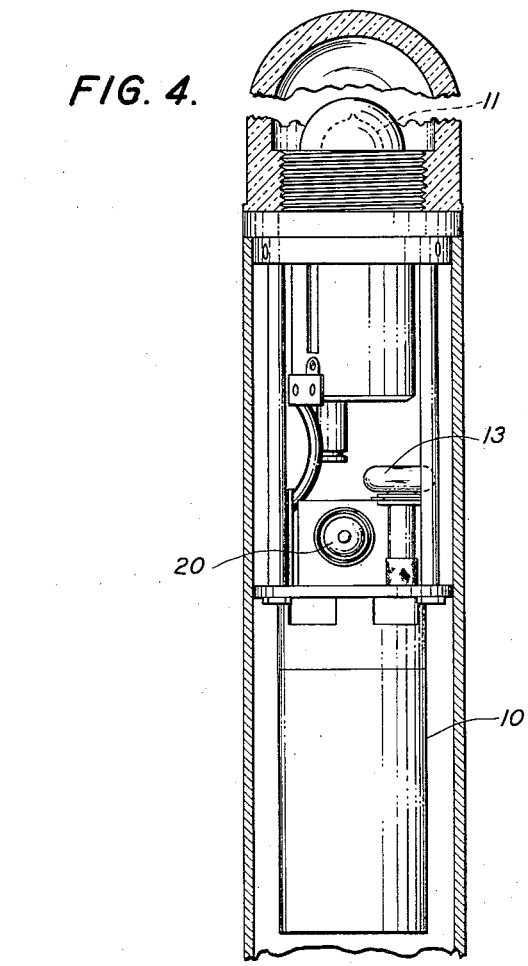
Fig. 4 is an elevational view, partially in section, showing the mechanical construction of an emergency light constructed in accordance with my invention.

Fig. 4 shows an embodiment of my invention adapted for use as an emergency light. The placement of the firing tube 20, the flashing tube 11, the mercury switch 13, and the storage capacitor 10 may be readily seen.

In the embodiment of Fig. 4, the placement of the mercury switch 13 is such that when the light is in a horizontal position, the mercury switch 13 interrupts the charging path from the battery so as to render the light inoperative. The embodiment of Fig. 4 has been found to be particularly adapted to use in connection with sea rescue where the light is carried aboard an aircraft or submarine in a horizontal position, and rights itself to a vertical position, thereby closing the mercury switch when dropped into the water. A brilliant periodic flash is then provided to guide rescuers.

Figure 5:
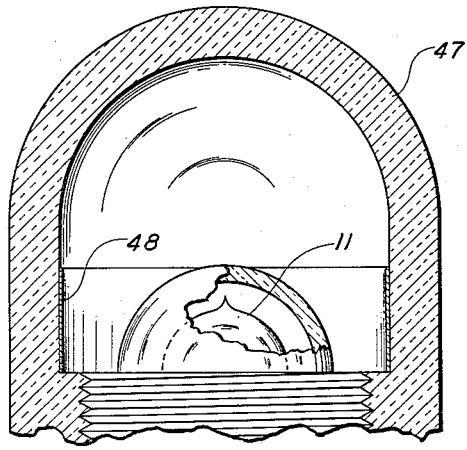
Fig. 5 is an elevational view, partially in section, of one type of gas filled flash tube, along with a housing which is partially coated with phosphorescent material.

Fig. 5 shows one type of gas filled flash tube 11 which may be employed in connection with the present invention. The flash tube 11 may be housed in a transparent casing 47 for protection.

In one embodiment of my invention, I have found that placing a phosphorescent or fluorescent material in close proximity to the flash tube is advantageous where the invention is to be employed as an emergency rescue light. Thus, a band of material 48 may be deposited on a transparent housing 47 to provide a continuous glow of light between the periodic flashes. The color of the housing 47 may be selected to provide a desired color for the flashes of light. For example, where the invention is to be employed as a channel marker at sea, it may be desired to make the color of the housing 47 red or green.

Although specific circuit values have been shown, it will be appreciated that these values are indicative of those employed in workable embodiments, and hence are merely exemplary. The values of the capacitors are given in microfarads ($\mu$fd.) and the values of the resistors are given in ohms, where meg=megohm.

I claim:

In apparatus for providing periodic flashes of light including direct current supply means having a positive side and a negative side, a flash tube having at least two electrodes between which is disposed an ionizable gas, a first storage capacitor coupled between the two electrodes, means coupling the first storage capacitor between the positive and negative sides of the direct current supply means, an auxiliary electrode for the flash tube, a transformer coupled to the auxiliary electrode, and a second storage capacitor coupled to the transformer, the improvement which comprises a second gas filled tube having a cathode, an anode, and having a first grid electrode for actuating the tube, a third capacitor coupled between the cathode and first grid electrode of the second tube, an electrical resistance coupled between said first grid electrode and the positive side of the direct current supply means for automatically charging the third capacitor, the second gas filled tube also having a second grid electrode, and disabling means including a photocell coupled to the second grid electrode for disabling the second tube during daylight hours whenever the light striking the photocell exceeds a predetermined level.

References Cited in the file of this patent

UNITED STATES PATENTS

| | | |
|---|---|---|
| 2,478,901 | Edgerton | Aug. 16, 1949 |
| 2,538,577 | McCarty | Jan. 16, 1951 |